United States Patent
Van Nest et al.

(10) Patent No.: US 9,053,506 B2
(45) Date of Patent: Jun. 9, 2015

(54) CUSTOMER ASSISTANCE REQUEST SYSTEM USING SMART DEVICE

(75) Inventors: Nancy Lee Van Nest, Delray Beach, FL (US); Stewart E. Hall, Wellington, FL (US); Gustavo Leon, Pembroke Pines, FL (US); Paul Brent Rasband, Lantana, FL (US); Timothy J. Relihan, Loxahatchee, FL (US); David M. Salcedo, Lake Worth, FL (US)

(73) Assignee: Tyco Fire & Security GmbH, Neuhausen am Rheinfall (CH)

(*) Notice: Subject to any disclaimer, the term of this patent is extended or adjusted under 35 U.S.C. 154(b) by 145 days.

(21) Appl. No.: 13/547,628

(22) Filed: Jul. 12, 2012

(65) Prior Publication Data

US 2013/0254304 A1 Sep. 26, 2013

Related U.S. Application Data

(60) Provisional application No. 61/614,159, filed on Mar. 22, 2012.

(51) Int. Cl.
| | |
|---|---|
| *G06F 15/16* | (2006.01) |
| *G06Q 30/06* | (2012.01) |
| *G06Q 20/20* | (2012.01) |
| *H04L 12/58* | (2006.01) |
| *H04W 4/02* | (2009.01) |
| *H04W 4/12* | (2009.01) |

(Continued)

(52) U.S. Cl.
CPC ............ *G06Q 30/0617* (2013.01); *G06Q 20/20* (2013.01); *H04L 12/58* (2013.01); *H04W 4/02* (2013.01); *H04W 4/12* (2013.01); *H04L 67/04* (2013.01); *G06Q 10/103* (2013.01)

(58) Field of Classification Search
None
See application file for complete search history.

(56) References Cited

U.S. PATENT DOCUMENTS

| 6,587,835 B1 * | 7/2003 | Treyz et al. ............... 705/14.64 |
| 2004/0203633 A1 * | 10/2004 | Knauerhase et al. ...... 455/414.1 |

(Continued)

FOREIGN PATENT DOCUMENTS

| EP | 0697670 A1 * | 2/1996 | ............... G06F 17/60 |
| EP | 0973316 A2 * | 1/2000 | ............ H04M 11/20 |

(Continued)

OTHER PUBLICATIONS

EPO International Search Report dated Nov. 29, 2012 for corresponding appln PCT/US12/048811.

*Primary Examiner* — Mohamed Ibrahim
*Assistant Examiner* — James Fiorillo
(74) *Attorney, Agent, or Firm* — Alan M. Weisberg; Christopher & Weisberg, P.A.

(57) ABSTRACT

A method and computer for responding to an assistance request message. An assistance request message from a requester mobile device associated with a requester is received at a response computer. The assistance request message includes at least one input parameter. A responder is determined, from multiple potential responders, to respond to the assistance request message. The responder is associated with responder data corresponding to the at least one input parameter. An availability inquiry message to a responder device associated with the responder is transmitted. A response to the availability inquiry message is received from the responder device. When the response to the availability inquiry message indicates that the responder is available to respond to the assistance request message, the requester mobile device is notified that the responder is available.

21 Claims, 9 Drawing Sheets

(51) Int. Cl.
*H04L 29/08* (2006.01)
*G06Q 10/10* (2012.01)

(56) References Cited

U.S. PATENT DOCUMENTS

| | | | |
|---|---|---|---|
| 2006/0047615 A1* | 3/2006 | Ravin et al. | 706/50 |
| 2006/0265270 A1* | 11/2006 | Hyder et al. | 705/9 |
| 2007/0205278 A1* | 9/2007 | Lovett | 235/383 |
| 2007/0255611 A1* | 11/2007 | Mezo et al. | 705/9 |
| 2008/0228600 A1* | 9/2008 | Treyz et al. | 705/27 |
| 2010/0262554 A1* | 10/2010 | Elliott | 705/323 |
| 2010/0299212 A1* | 11/2010 | Graylin et al. | 705/14.66 |
| 2013/0006789 A1* | 1/2013 | Fulkerson | 705/26.1 |
| 2013/0006847 A1* | 1/2013 | Hammad et al. | 705/39 |
| 2013/0238685 A1* | 9/2013 | Aziz | 709/203 |

FOREIGN PATENT DOCUMENTS

| | | | | |
|---|---|---|---|---|
| EP | 0973316 A2 | 9/2002 | | |
| GB | 2373881 A | * 10/2002 | | G06F 17/60 |
| WO | WO 03/084179 A1 | 10/2003 | | |
| WO | WO 03084179 A1 | * 10/2003 | | |

* cited by examiner

CUSTOMER ASSISTANCE REQUEST SYSTEM USING SMART DEVICE

CROSS-REFERENCE TO RELATED APPLICATION

This application is related to and claims priority to U.S. Provisional Application Ser. No. 61/614,159, filed Mar. 22, 2012, entitled "CUSTOMER ASSISTANCE REQUEST SYSTEM USING SMART DEVICE ENABLED FOR SHORT-RANGE RF COMMUNICATION" the entirety of which is incorporated herein by reference.

STATEMENT REGARDING FEDERALLY SPONSORED RESEARCH OR DEVELOPMENT n/a

TECHNICAL FIELD

The present invention relates to customer assistance systems and in particular to a method and system for determining a responder to respond to an assistance request message.

BACKGROUND

The retail shopping environment experience is often the deciding factor as to whether a retail customer will purchase a product. For example, the customer may casually browse the store when an item catches the customer's attention. If the customer is familiar with the item and brand through previous research such as consumer ratings, then the customer is likely to make a definitive decision whether or not to purchase the item. For example, the customer's past research may indicate that the item is highly reliable, thereby likely influencing the customer to purchase the item. However, as often happens, the customer is unfamiliar with the item and/or brand. In this case, the customer will have to either (i) ask a sales associate for information about the item, or, if there are no sales associates nearby to assist the customer, the customer will have to (ii) rely on the limited information displayed on the item itself, item box and/or store display. Often, such limited information is not likely to influence the customer to purchase the item. Customers who are assisted by a sales associate are much more likely to buy an item than customers who do not receive assistance. This is because customers often have questions about the item, which are ideally answered in face-to-face communication with a sales associate, who may have expert knowledge of the item and may influence a customer's buying decision. Failing to provide assistance to the customer, while casually shopping, may negatively impact the customer buying experience and may dissuade the customer from purchasing an item.

The most common means used by retailers to create face-to-face assistance for customers is to keep multiple sales associates in different store departments at all times. Unfortunately, this results in high labor costs for the retailer. Another option includes providing a red phone at various locations in the store. A customer can use the red phone to call and request assistance. However, this requires a customer to find a red phone, and requires that a sales assistant be assigned to sit by the phone at all times to answer the phone calls.

SUMMARY

The present invention advantageously provides a method and system for receiving an assistance request message and determining a responder to respond to the assistance request message. In accordance with one aspect, a method of receiving an assistance request message from a requester is provided. An assistance request message from a requester mobile device associated with a requester is received at a response computer. The assistance request message includes at least one input parameter. A responder is determined, from a plurality of responders, to respond to the assistance request message. The responder is associated with responder data corresponding to the at least one input parameter. An availability inquiry message is transmitted to a responder device associated with the responder. A response to the availability inquiry message is received from the responder mobile device; and when the response to the availability inquiry message indicates that the responder is available to respond to the assistance request message, the requester mobile device is notified that the responder is available. The requester mobile device receives a message from the response computer indicating that a responder is available to respond to the assistance request message.

In accordance with another aspect, a computer includes a receiver, a processor in communication with the receiver, and a transmitter in communication with the receiver and processor. The receiver is configured to receive an assistance request message from a requester mobile device associated with a requester. The assistance request message includes at least one input parameter. The processor is configured to determine a responder, from a plurality of responders, to respond to the assistance request message. The responder is associated with responder data corresponding to the at least one input parameter. The transmitter is configured to transmit an availability inquiry message to a responder device associated with the responder. The receiver is configured to receive a response to the availability inquiry message from the responder mobile device. When the response to the availability inquiry message indicates that the responder is available to respond to the assistance request message, the transmitter transmits a notification to the requester mobile indicating that the responder is available.

In accordance with another aspect, a method for using a requester mobile device for sending an assistance request message, is provided. At a requester mobile device, tag information is received from a tag. The assistance request message is transmitted from the requester mobile device to a response computer in which the assistance request message includes the tag information and at least one input parameter. A message indicating that a responder is available to respond to the assistance request message is received at the requester mobile device from the response computer. The responder is associated with responder data corresponding to the at least one input parameter.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
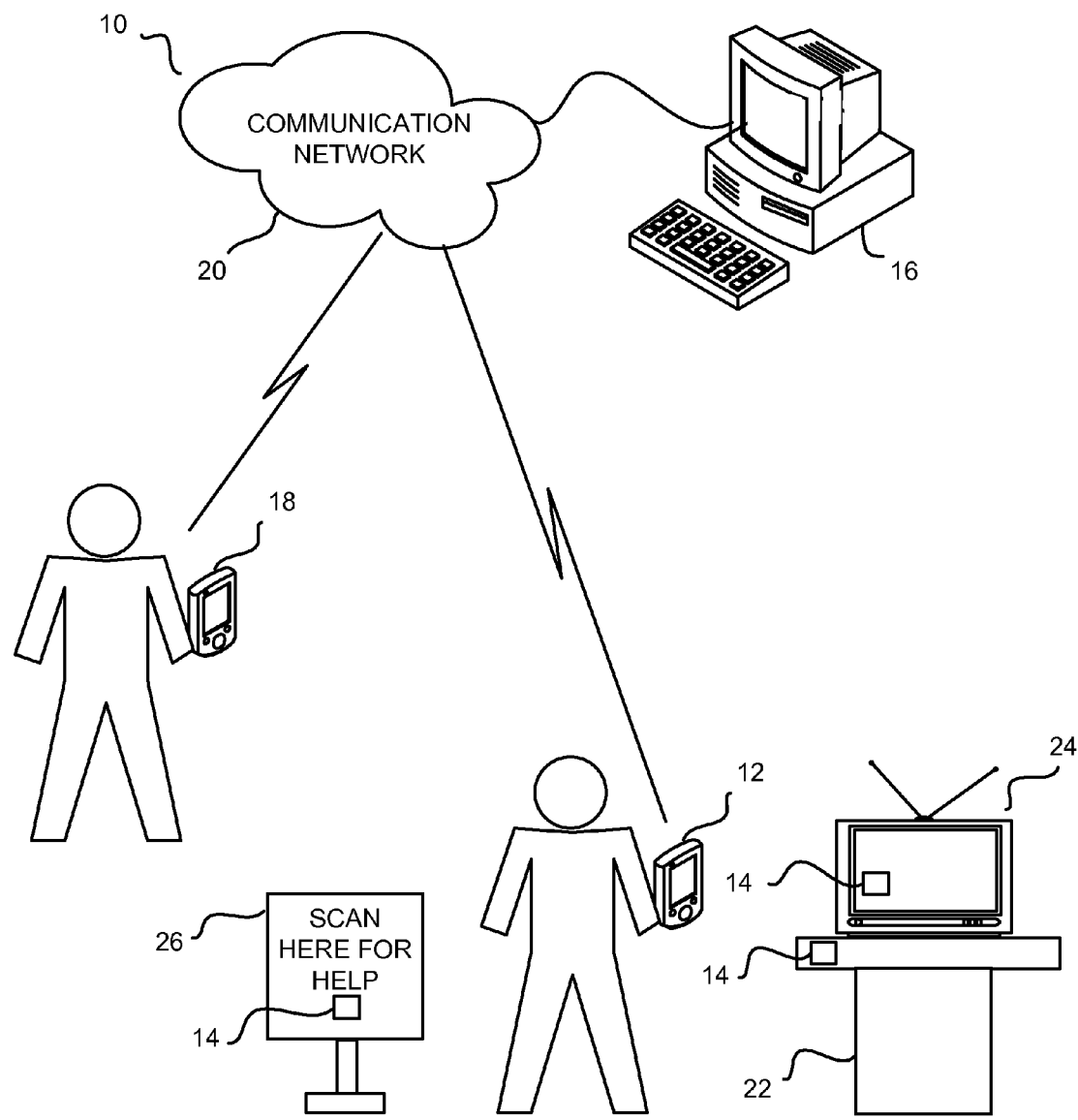
FIG. 1 is a block diagram of an exemplary system for responding to an assistance request message, in accordance with the principles of the present invention.

Embodiments of the present invention provide a method and system for responding to an assistance request message. In accordance with an embodiment of the present invention, an assistance request message is received from a requester. The assistance request message includes at least one input parameter. A responder is determined, from multiple responders, to assist the customer, i.e., to respond to the assistance request message. The responder is associated with responder data corresponding to the at least one input parameter. For example, in the case where an input parameter identifies a specific product or product category, this association may be made based on responder expertise and previous training related to the product. An availability inquiry message is sent to the responder to determine whether the responder is available to assist the requester. A response to the availability inquiry message is received, and when the response indicates that the responder is available, the requester is notified that the responder is on his/her way to help the requester.

Before describing in detail exemplary embodiments that are in accordance with the present invention, it is noted that the embodiments reside primarily in combinations of apparatus components and processing steps related to implementing a method, system and a computer device for responding to an assistance request message. Accordingly, the method, system, and computer device components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Referring now to the drawing figures in which reference designators refer to like elements, there is shown in FIG. 1 a diagram of an exemplary system constructed in accordance with the principles of the present invention and designated generally as "10." System 10 may include requester mobile device 12, tags 14, response computer 16, and responder mobile device 18. System 10 may also include communication network 20 that supports communication between requester mobile device 12, responder mobile device 18 (collectively referred to as "mobile device") and response computer 16. Tag 14 may be removably affixed to fixture 22 such as a shelf edge as is commonly found in retail stores, on item 24, proximate item 24 or on display/poster 26, which may state "Scan Here for Help." Tag 14 may also be attached to the packaging of item 24. Item 24 may be a retail item such a television or a book.

A requester, e.g., a customer at a retail store, may use requester mobile device 12 to request assistance from a sales associate or information on item 24. A requester may send an assistance request message using a mobile device application installed in requester mobile device 12. The requester initiates transmission of the assistance request message by scanning or bumping tag 14 using requester mobile device 12. Requester mobile device 12 may use near field communication also referred to as "NFC" to establish radio communication by touching or bringing requester mobile device 12 in close proximity to tag 14. Response computer 16 receives the assistance request message and determines a responder, e.g., a sales associate working at the retail store, to respond to the assistance request message. Response computer 16 selects a responder based at least in part on the at least one input parameter. The input parameter may include tag data, responder data, requester data, and item data, among other data. Response computer 16 sends the responder an availability inquiry message. The responder receives the availability inquiry message on responder mobile device 18. The responder replies to the availability inquiry message indicating whether or not the responder is available to assist the customer. If the responder is available, the requester is notified that help is on the way. Else if the responder is not available, response computer 16 determines another responder. Communication network 20 allows requester mobile device 12 to establish bidirectional communication with responder mobile device 18.

Communication network 20 may include a cellular communication network and the Public Switched Telephone Network ("PSTN"), an internet protocol ("IP") network that may be established as a wide area network ("WAN") and/or local area network ("LAN"), such as an Ethernet LAN, among other IP-based networks. Communication network 20 may be a wireless network, such as Wi-Fi, satellite, infrared, Bluetooth, Ultra Wide Band ("UWB"), Zigbee, Wireless Personal Area Network ("WPAN"), or other communication network. Requester mobile device 12 and responder mobile device 18 may be connected via communications network 20 to response computer 16 and to other computers, such as computers associated with a merchandise supplier, or any other third party (not shown) located on the retail store premises or at some other location accessible through the Internet or World-Wide-Web. Communication network 20 may be an in-store network that allows customers within or proximate the store to access and communicate with response computer 16, responder mobile device 18, tag 14 and/or the Internet. Requester mobile device 12 and responder mobile device 18 may communicate with each other, with tag 14 and with response computer 16, via communication network 20, using communication protocols known in the art.

Figure 2:
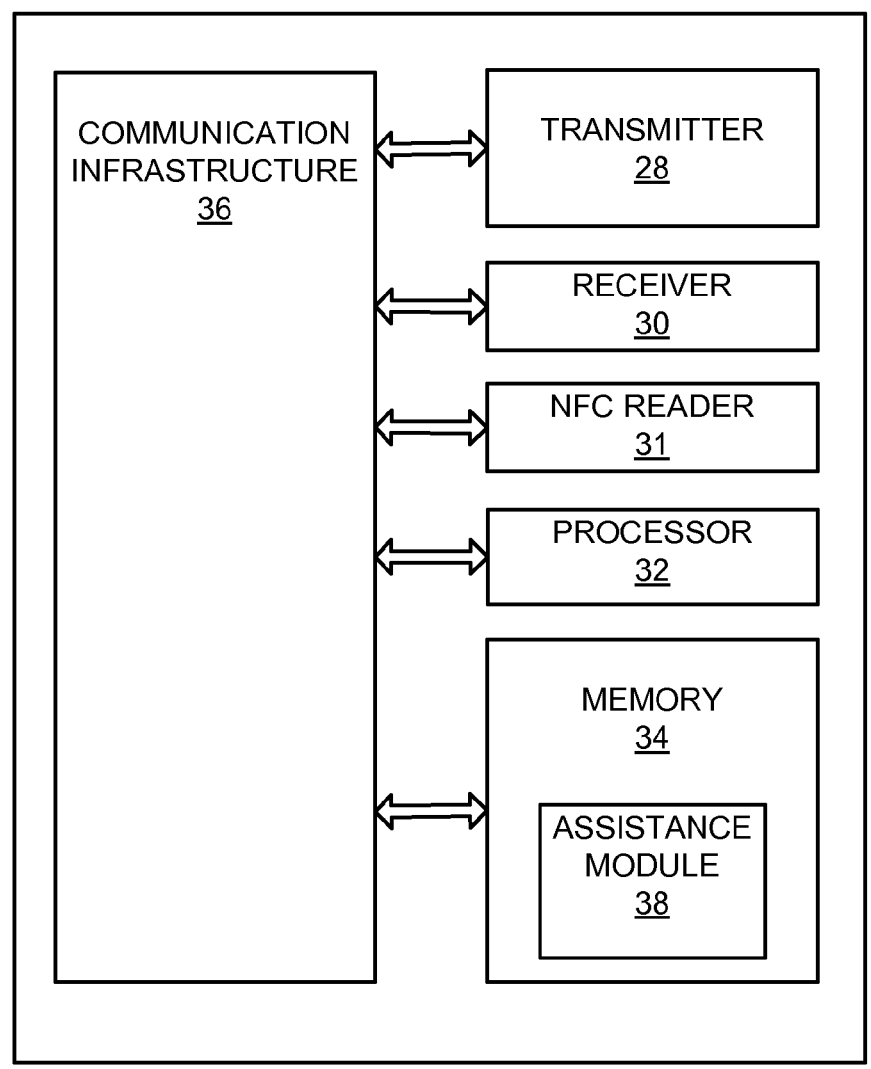
FIG. 2 is a block diagram of an exemplary mobile device, constructed in accordance with the principles of the present invention.

FIG. 2 is a block diagram of an exemplary mobile device, such as requester mobile device 12 and responder mobile device 18. Each of requester mobile device 12 and responder mobile device 18 may include transmitter 28, receiver 30, processor 32, and memory 34, among other hardware and software. Transmitter 28, receiver 30 processor 32 and memory 34 may be in communication with each other via communication infrastructure/bus 36. Memory 34 may store assistance module 38, among other modules. Additionally, requester mobile device 12 and responder mobile device 18 may include an near-field communication ("NFC") reader 31. NFC reader 31 may be a separate elements as shown in FIG. 2 or be implemented as part of receiver 30 or transmitter 28. Each of requester mobile device 12 and responder mobile device 18 may be a device such as a portable wireless device, a smart device, mobile phone, personal digital assistant ("PDA"), laptop, among other devices that display text and/or graphical content. The mobile device may also include a global positioning system ("GPS") that identifies an approximate location of the requester. Alternatively, the mobile device may use signal strength information for its Wi-Fi (IEEE 802.11) wireless link, or WPAN or Zigbee wireless signal strength values in conjunction with triangulation, receiver proximity and ranging algorithms to determine the location of the requester. The location coordinates may be included in an assistance request message. Although the responder's device is described and discussed herein as a mobile device, the invention is not limited to such. It is contemplated that the responder's device can be a fixed device such as a desktop computer or a special function kiosk located in the store aisle near the location of the retail item of interest to the requester.

Transmitter 28 may transmit data packets to response computer 16 and tag 14 via communication network 20. Transmitter 28 may also allow requester mobile device 12 and responder mobile device 18 to communicate with tag 14 using short range radio communications. Receiver 30 may receive data packets from response computer 16 via communication network 20 and from tag 14 using short range radio communications. Transmitter 28 and receiver 30 functionality may be replaced by transceiver. NFC reader 31 may receive communications from tag 14 up to 30 cm away via short range radio signals. The distance of short range radio communications between the NFC reader 31 and tag 14 may be varied depending on various factors such as the size of mobile device, tag size, a mobile device antenna size and type, power requirements of the NFC transceiver, among other factors.

It is understood that the NFC distance is not limited to 30 cm and may be greater than 30 cm. The NFC reader 31 may enable radio communication between tag 14 and both requester mobile device 12 and responder mobile device 18. Requester mobile device 12 and responder mobile device 18 may establish communication with tag 14 by scanning tag 14, touching tag 14 or by bringing requester mobile device 12 and/or responder mobile device 18 into close proximity to tag 14, which is commonly referred to as "bumping". The NFC reader 31 may enable contactless transactions, data exchange, and Wi-Fi protocol communication between tag 14 and requester mobile device 12 and/or responder mobile device 18.

In particular, NFC reader 31 enables communication with tag 14 allowing two-way interactions between a mobile device and tag 14. The two-way interactions may include transmitting data in response to receiving an interrogation signal, receiving data in response to transmitting an interrogation signal, among other two-way interactions where requester mobile device 12 and responder mobile device 18 capture tag data from tag 14. For example, NFC reader 31 may transmit an interrogation signal to tag 14 in which tag 14 responds by transmitting tag data to the NFC reader 31, as is discussed in detail below.

Processor 32 may include a central processing unit ("CPU") for executing computer program instructions stored in memory 34, as is well known in the art. Memory 34 may include non-volatile and volatile memory. For example, non-volatile memory may include a hard drive, memory stick, flash memory and others known in the art, and volatile memory may include random access memory and others known in the art. Memory 34 may store computer program instructions that are executed by processor 32. Program instructions, when executed by processor 32, may provide the functionality for assistance module 38.

Assistance module 38 may include a mobile device application. The mobile device application may be downloaded to a mobile device, i.e., requester mobile device 12 and responder mobile device 18 from communication network 20; transferred to a mobile device from a removable memory (not shown) such as universal serial bus ("USB") flash memory, secure data ("SD") memory; downloaded from tag 14, which may store the mobile device application for transmission directly to the mobile device upon scanning, and the like. The mobile device application may also be downloaded from the Internet via communication network 20 or may be preinstalled on memory 34 of the mobile device, e.g., the phone manufacturer or provider installs the mobile device application on the mobile device prior to sale to the end user.

The mobile device application installed on the mobile device may communicate with response computer 16 via communication network 20. The mobile device application may start/execute automatically once the mobile device is brought proximate to a location, such as a retail store, may start automatically when tag 14 is scanned or bumped by the mobile device or may be manually started by a requester or responder. If the mobile device does not have the mobile device application already installed, response computer 16 may send a message to the mobile device requesting permission to install the mobile device application on the mobile device.

The mobile device application may be either a requester mobile device application installed in requester mobile device 12 or a responder mobile device application installed in responder mobile device 18. Different functionalities may be supported by the mobile device application depending on whether the mobile device application is customized as a requester mobile device application or as a responder mobile device application. For example, the requester mobile device application may display a requester user interface that is designed for a requester, e.g., for a customer, while the responder mobile device application may display a responder user interface that is designed for use by sales associates and employees of a retail store. The requester user interface and the responder user interface are discussed in more detail in FIG. 9.

The requester mobile device application may have not only a different user interface, but also different components and functionality than the responder mobile device application. For example, the requester mobile device application may establish communication between requester mobile device 12 and response computer 16 upon a requester entering the retail store. Response computer 16 may trigger execution of the requester mobile device application upon a requester entering an area, such as a retail store. Response computer 16 may determine whether the requester mobile device application has been associated with a requester user profile/requester profile. If a requester user profile is not associated with the mobile device application, response computer 16 may send a message to requester mobile device 12 prompting the requester to create a requester user profile. The mobile device application may be configured to prompt the requester to enter a username and password to access the requester user profile. The requester mobile device application allows a requester, such as a customer of a retail store, to request assistance from an employee of the retail store, get information on an item 24 of interest and get information about the retail store by scanning or bumping tag 14 with requester mobile device 12. While the requester mobile device application is designed to be used by a requester, the responder mobile device application is designed to be used by a responder. The responder mobile device application installed in responder mobile device 18 allows an employee of the retail store to indicate their availability to respond to an assistance request message sent by a requester.

In another exemplary embodiment, requester mobile device 12 and responder mobile device 18 may be a smart device phone, such as a Samsung® Nexus S, equipped with an NFC chip set. The smart phone can read information from smart tags or objects that include an NFC chip set. The objects may be, for example, stickers, movie posters, t-shirts, etc. Similarly, tag 14 may be implemented using a Kovio™ CS 77A0 tag. Tag 14 may have any shape. For instance, tag 14 may be a square tag, such as for example a logo Ultralight™ C sticker (35 mm×35 mm) or a Ultralight C™ sticker (55 mm×55 mm), a rectangle tag, such as for example a Mifare™ classic sticker (86 mm×54 mm), or a circle tag, such as for example outdoor type two NFC sticker (with a 30 mm diameter) backed by a Mifare™ Ultralight™ chip. The outdoor type two NFC sticker may store up to 48 bytes of data and may be configured to be read-only data. Data encoded in tag 14 may be encoded using a smart phone application software, such as "NFC TagWriter™ by NXP™," which is an Android™ application by NXP™ semiconductors.

In another exemplary embodiment, requester mobile device 12 and responder mobile device 18 may include an Android™ operating system, such as version Ice Cream Sandwich™ or Gingerbread™. The requester mobile device application and the responder mobile device application may be developed using a programming language such as Java®. The programming environment may include Eclipse IDE for Java Developers®. Implementing NFC tag reading may include modifying files in the requester mobile device application and the responder mobile device application. The AndroidManifest.xml file presents information about the application to the Android™ operating system, so that the operating system may run the application's code. For example, the AndroidManifest.xml file, which is included in every application developed for Android™, may be modified to define NFC permissions. Additionally, text message support for the application may be added by adding SEND_SMS and RECEIVE_SMS permissions to the AndroidManifest.xml file.

An application, such as a requester mobile device application or a responder mobile device application, may include three core components, such as activities, services and broadcast receivers, which are activated through messages called "intents." An "intent" object holds a description of an operation to be performed, such as initiating a service or delivering new instructions. The application may find the appropriate activity, service or broadcast receivers to respond to the intent. To inform the application which intents may be handled, the activities, services and broadcast receivers can have one or more intent filters. Each intent filter describes a set of intents that the application can receive, by filtering out unwanted intents. Assigning an intent-filter identifying an activity that will respond to the NFC tag read may include specifying a TAG_DISCOVERED action. An activity which responds to the NFC tag read event may be created to contain a method to resolve the intent. The method may execute when the NFC tag is read. The responder mobile device application and requester mobile device application may utilize the NFC-Adapter class to receive and parse the incoming message generated when the NFC tag is read. The NdefMessage definition may provide the template to interpret the NFC tag data.

In another exemplary embodiment, the application may send text messages specifying a phone number that maps to a Google® voice number. The Android™ class SmsManager may be used to send the text message ("sentTextmessage"). A Java® application software may run in an Amazon® web service instance may monitor the inbox messages that arrive at the phone number that maps to the Google® voice number. The assistance request text message may be received and processed by the Java® application. The Java® application may execute business logic to determine an appropriate responder to respond to the assistance request message.

Figure 3:
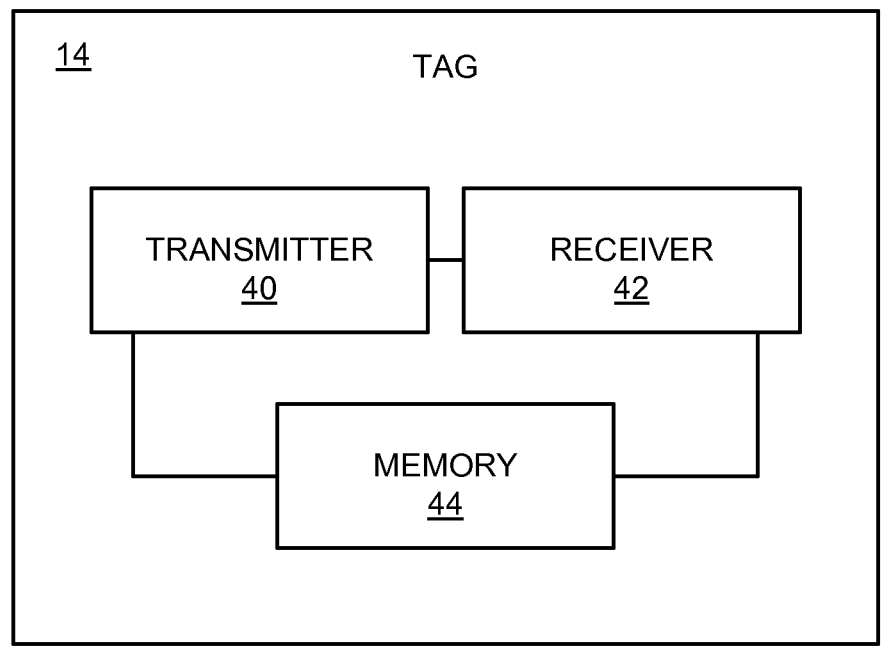
FIG. 3 is a block diagram of an exemplary tag, constructed in accordance with the principles of the present invention.

FIG. 3 is a block diagram of an exemplary tag 14. Tag 14 may include transmitter 40, receiver 42 and memory 44 in communication with each other. In particular, transmitter 40, receiver 42 and memory 44 may function substantially the same as the corresponding requester mobile device 12 and/or responder mobile device 18 components, with size and performance being adjusted based on design needs. Transmitter 40, receiver 42 and memory 44 may receive signals, transmit signals and store tag data. Transmitter 40 may be an NFC transmitter and receiver 42 may be an NFC receiver. Tag 14 may be a standalone tag or integrated into hardware such as an electronic price tag.

In an exemplary embodiment, tag 14 may include two separate transmitter/receiver units—one for the mobile device link and one for the store network link. The former may be a lower power and shorter range transmitter/receiver unit, and the second may have a greater range than the former, but may require more power. The antennas for these two transmitter/receiver units, e.g., transceivers, would be different, because of the different frequencies and Tx/Rx power levels. Tag 14 may be an NFC tag, among other tags. For example, NFC receiver 42 in tag 14 may receive a short range radio communication signal from NFC reader 31 in requester mobile device 12 and/or responder mobile device 18 and, in response, tag 14 may transmit tag data to NFC reader 31 in requester mobile device 12 and/or responder mobile device 18 via transmitter 40. Alternatively, tag 14 may be an RFID tag configured to transmit an RFID signal in response to a received RFID interrogation signal. Alternatively, tag 14 may incorporate an optical 1-dimensional or 2-dimensional barcode which can be scanned by either a barcode scanning application, device or a dedicated optical scanner in a mobile device. It is also contemplated that tag 14 may include more than one type of data encoding system, for example, NFC and optical barcode and RFID together, to accommodate a wide range of mobile device technologies that a requester might use.

In order to initiate communications, at least one of requester mobile device 12 and responder mobile device 18 may generate an RF field. Tag 14 may communicate with requester mobile device 12 and responder mobile device 18 using near-field communication, i.e., using magnetic induction between two loop antennas (a tag antenna and a requester mobile device 12 or responder mobile device 18 antenna) located within each other's near field and forming an air-core transformer. Tag 14 may communicate with requester mobile device 12 and/or responder mobile device 18 in different communication modes, such as passive communication mode or active communication mode.

In passive communication mode, the communication initiator, usually requester mobile device 12 or responder mobile device 18, provides an electromagnetic field that is modulated by tag 14. Tag 14 draws its operating power from the electromagnetic field provided, and acts as an electronic responder. In active communication mode, both the communication initiator and the target, i.e., the mobile devices and tag 14, alternatively generate electromagnetic fields. For example, tag 14 may deactivate its electromagnetic field when tag 14 receives data from requester mobile device 12 or responder mobile device 18. Active communication mode may require tag 14 to include its own power supply and not rely entirely on requester mobile device 12 and/or responder mobile device 18 to power tag 14.

When tag 14 is active or semi-active, tag 14 may include batteries to power its respective circuitry throughout the tag interrogation process. The batteries may provide the power needed to transmit an encoded data signal in response to receiving an interrogation signal. Tag 14 may contain tag data that may be rewritable by other data transmitted by requester mobile device 12 and/or responder mobile device 18. Tag 14 may use other types of data carriers, such as RFID and barcodes. It is also contemplated that tag 14 is a shelf edge label with a second transmitter/receiver, e.g., a WPAN or Zigbee module, and enough power to communicate directly with the store network. In this case tag 14 may periodically or in real time relay information about how often it is scanned to response computer 16 to provide merchandising information. Also, if the location of this active tag 14 with its own communication link is known, the communication link can be used to supply the location of the information requester at the time tag 14 is interrogated, e.g., "bumped".

Memory 44 is encoded with tag data which may include computer program instructions that when received and processed by requester mobile device 12 and/or responder mobile device 18, via processor 32, cause requester mobile device 12 and/or responder mobile device 18 to perform particular functions. For example, the computer program instructions in tag data may be configuration instructions that configure and format the way requester mobile device 12 and/or responder mobile device 18 displays information. Configuration and formatting instructions may include mobile device display screen layouts, application menu preferences, graphics layout that demand significant processing (graphics-rich), graphics layout that demand less processing (graphics-lean). Also, tag 14 may store customized computer program instructions such that the configuration and formatting of the mobile device application may be updated by scanning tag 14, e.g., each store may have a customized mobile device application layout.

Tag 14 may be configurable, i.e., tag 14 is programmable. In particular, tag 14 may be programmed wirelessly by a responder mobile device 18 of a store employee using wireless sensor protocols or using other tag programming methods known in the art. Also, in-store communication network 20 may periodically communicate with tag 14 such as to update tag data, e.g., may communicate with tag 14 through an in-store wireless communication network or a store employee's wireless device, such as, responder mobile device 18.

Also, tag 14 may include optically readable tags such as a barcode, stock-keeping unit ("SKU"), quick response ("QR") code, one dimensional barcode, two dimensional barcode, universal product code ("UPC") and other optically readable codes. In particular, NFC reader 31 in requester mobile device 12 and/or responder mobile device 18 may be replaced by an optical barcode scanner (not shown), or the optical barcode scanner may be added to requester mobile device 12 and/or responder mobile device 18 in addition to NFC reader 31. For example, optical barcode scanner may be a digital camera that captures an image of the barcode in which assistance module 38 decodes the captured image, via methods known in the art, to determine tag data.

Tag 14 may be affixed or removably affixed to various objects and/or fixture(s) 22 or item 24, an item tag, an item security tag, and the like. Also, tag 14 may be removably affixed display 26 so that customers may scan tag 14 using requester mobile device 12 or may bring requester mobile device 12 proximate to tag 14 to request additional information about item 24 or request assistance from a sales associate. Tag data in tag 14 may include data associated with item 24, such as information about item 24, model of item 24, name of item 24, price of item 24, identification number of item 24, the name of the store department where item 24 is located/a tag location, item description, item availability, item specifications, customer reviews of the item, item identifier, use information, similar/alternative products comparable to item 24, item care, item measurements, item return policy, item accessories, item rating, an item's country of origin, item energy consumption and other item data.

Figure 4:
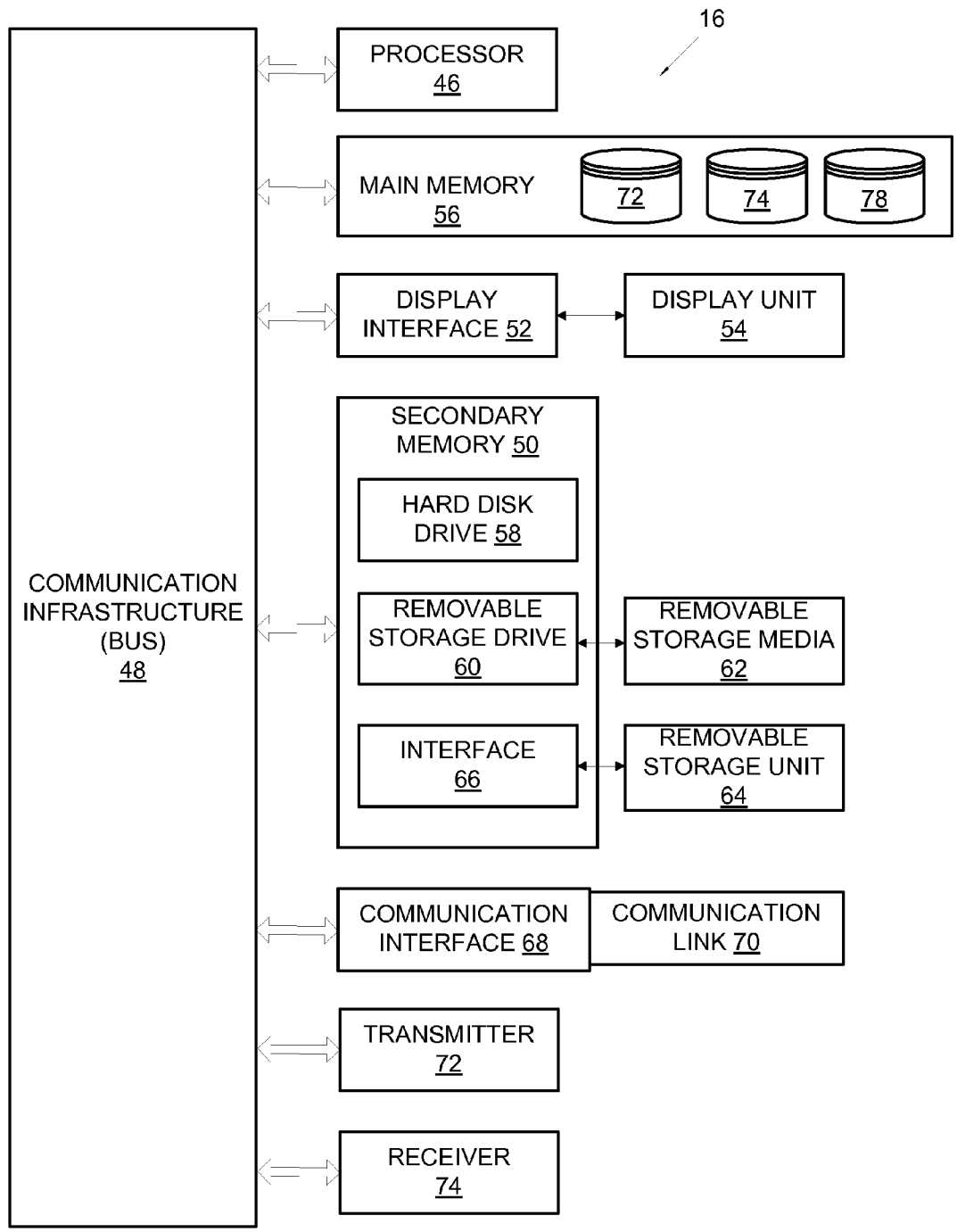
FIG. 4 is a block diagram of an exemplary response computer, constructed in accordance with the principles of the present invention.

FIG. 4 is a block diagram of an exemplary response computer 16, which could be a computer located at a retail store, or at a different location. Response computer 16 includes one or more processors, such as processor 46 programmed to perform the functions described herein. Processor 46 is operatively coupled to a communication infrastructure 48, e.g., a communications bus, cross-bar interconnect, network, etc. Processor 46 may execute computer programs stored on disk storage for execution via secondary memory 50. Response computer 16 may optionally include or share a display interface 52 that forwards graphics, text, and other data from the communication infrastructure 48 (or from a frame buffer not shown) for display on display unit 54. Display unit 54 may be a cathode ray tube (CRT) display, a liquid crystal display (LCD), light-emitting diode (LED) display or touch screen display, among other types of displays.

Response computer 16 also includes a main memory 56, such as random access memory ("RAM") and read only memory ("ROM"). Secondary memory 50 may include, for example, a hard disk drive 58 and/or a removable storage drive 60, representing a removable hard disk drive, magnetic tape drive, an optical disk drive, etc. The removable storage drive 60 reads from and/or writes to a removable storage media 62 in a manner well known to those having ordinary skill in the art. Removable storage media 62, represents, for example, a floppy disk, external hard disk, magnetic tape, optical disk, etc. which is read by and written to by removable storage drive 60. As will be appreciated, the removable storage media 62 includes a computer usable storage medium having stored therein computer software and/or data.

In alternative embodiments, secondary memory 50 may include other similar devices for allowing computer programs or other instructions to be loaded into the computer system and for storing data. Such devices may include, for example, a removable storage unit 64 and an interface 66. Examples of such may include a program cartridge and cartridge interface (such as that found in video game devices), flash memory, a removable memory chip (such as an EPROM, EEPROM or PROM) and associated socket, and other removable storage units 64 and interfaces 66 which allow software and data to be transferred from the removable storage unit 64 to other devices.

Response computer 16 may also include a communications interface 68. Communications interface 68 allows software and data to be transferred to external devices. Examples of communications interface 68 may include a modem, a network interface (such as an Ethernet card), a communications port, a PCMCIA slot and card, wireless transceiver/antenna, etc. Software and data transferred via communications interface/module 68 may be, for example, electronic, electromagnetic, optical, or other signals capable of being received by communications interface 68. These signals are provided to communications interface 68 via the communications link (i.e., channel) 70. Channel 70 carries signals and may be implemented using wire or cable, fiber optics, a phone line, a cellular phone link, an RF link, and/or other communications channels.

It is understood that response computer 16 may have more than one set of communication interface 68 and communication link 70. For example, response computer 16 may have a communication interface 68/communication link 70 pair to establish a communication zone for wireless communication, a second communication interface 68/communication link 70 pair for low speed, e.g., WLAN, wireless communication, another communication interface 68/communication link 70 pair for communication with low speed wireless networks, and still another communication interface 68/communication link 70 pair for other communication.

Computer programs (also called computer control logic) are stored in main memory 56 and/or secondary memory 50. For example, computer programs are stored on disk storage, i.e. secondary memory 50, for execution by processor 46 via RAM, i.e. main memory 56. Computer programs may also be received via communications interface 68. Such computer programs, when executed, enable the method and system to perform the features of the present invention as discussed herein. In particular, the computer programs, when executed, enable processor 46 to perform the features of the corresponding method and system. Accordingly, such computer programs represent controllers of the corresponding device.

Although a single response computer 16 is mentioned, the present invention is not limited to such. It is contemplated that more than one response computer 16 can be implemented. Therefore, response computer 16 functionality may be performed by a single computer or distributed among multiple computers or computing devices. For example, response computer 16 functionality may be performed by an in-store or off-site response computer 16. Alternatively, response computer 16 functionality may be performed by several computing devices that may be located in the same general location or different locations, e.g., cloud computing. In other words, each computing device may perform one or more particular sub-processes of response computer 16. As such, response computer 16 may be a system of components that functions collectively to receive, process and respond to assistance request messages.

Various software embodiments are described in terms of this exemplary computer system. It is understood that computer systems and/or computer architectures other than those specifically described herein can be used to implement the invention. It is also understood that the capacities and quantities of the components of the architecture described above may vary depending on the device, the quantity of devices to be supported, as well as the intended interaction with the device. For example, configuration and management of response computer 16 may be designed to occur remotely by web browser. In such case, the inclusion of display interface 52 and display unit 54 may not be required. Even though response computer 16 is described herein as comprising hardware devices, response computer 16 may be implemented in software executed in a cloud server infrastructure.

Response computer 16 may periodically transmit pricing and item data updates onto store communication network 20. Tag 14, requester mobile device 12 and/or responder mobile device 18 may receive the pricing and item data from response computer 16 via communication network 20. That is, a client application on store response computer 16 may use a traditional internet working protocol stack such as Ethernet/IP/TCP/HTTP or similar technology to communicate with tag 14, requester mobile device 12 and responder mobile device 18. Response computer 16, requester mobile device 12 and responder mobile device 18 may be configured to communicate with each other using text messages, email, Short Message Service ("SMS") or any other Internet communication.

Response computer 16 may include or may be in communication with item database 72, potential responder database 74 and requester database 78. Item database 72, potential responder database 74 and requester database 78 may be stored in main memory 56, an external storage device, or in another computer in communication with response computer 16 (not shown). Item database 72, potential responder database 74 and requester database 78 may include input parameters that may be relevant to the determination of a responder. Response computer 16 may be configured to determine a responder to respond to an assistance request message based at least on an input parameter included in the assistance request message. Additionally, response computer 16 may also use data in item database 72, potential responder database 74 and requester database 78 as input parameters to determine an appropriate responder. Although data is described as being stored in databases, the invention is not limited to such, and other data structures may be used to store data. For example, data may be stored in a text file or a hash table.

As such, response computer 16 may determine a potential responder to respond to the assistance request message based at least on data associated with the requester, the potential responder, tag 14 and/or item 24. Requester data 80 associated with the requester may include, but not be limited to, data stored in exemplary requester database 78 and data entered by the requester. Data associated with the potential responder may include, but not be limited to, data stored in exemplary potential responder database 74. Data associated with the tag 14 may include, but not be limited to data in tag 14, and data associated with item 24 may include, but not be limited to, item data stored in exemplary item database 72. Other data, in addition to or instead of data stored in exemplary item database 72, exemplary responder database 74, requester database 78 and tag 14 may be used to determine a responder.

Figure 5:
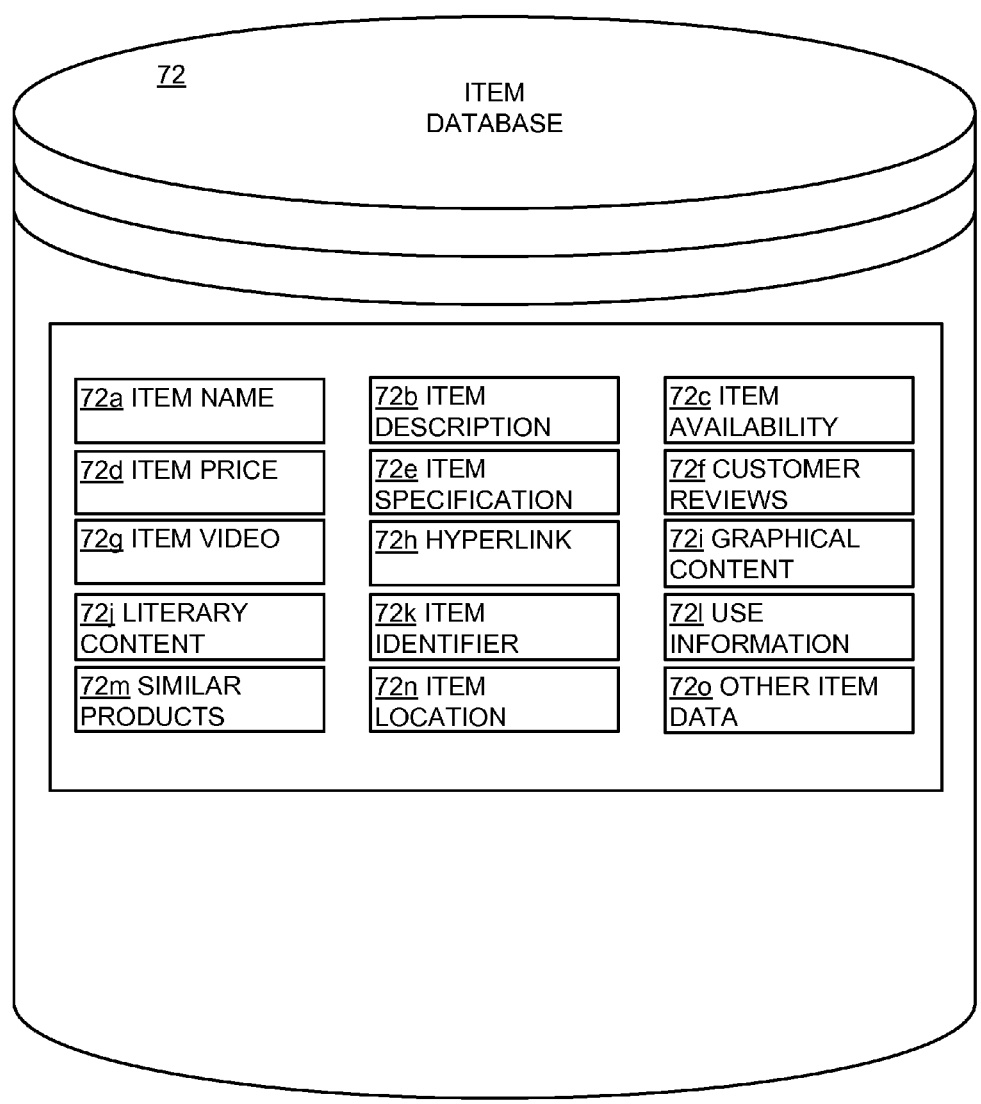
FIG. 5 is a block diagram of an exemplary item database, constructed in accordance with the principles of the present invention.

FIG. 5 is a block diagram of an exemplary item database 72. Item database 72 stores pricing and item data related to products within a retail store, such as item 24. Item database 72 may include an item name 72a, item description 72b, item availability 72c, item price 72d, item specifications 72e, customer reviews of the item 72f, item video 72g, hyperlinks to websites containing information about an item 72h, graphical content 72i, literary content 72j, item identifier 72k, use information 72l, similar/alternative products 72m comparable to item 24, item location 72n and other item data 72o. Item database 72 may be associated with a predetermined vendor and may be stored in a vendor computer that communicates with response computer 16 via communication network 20.

Figure 6:
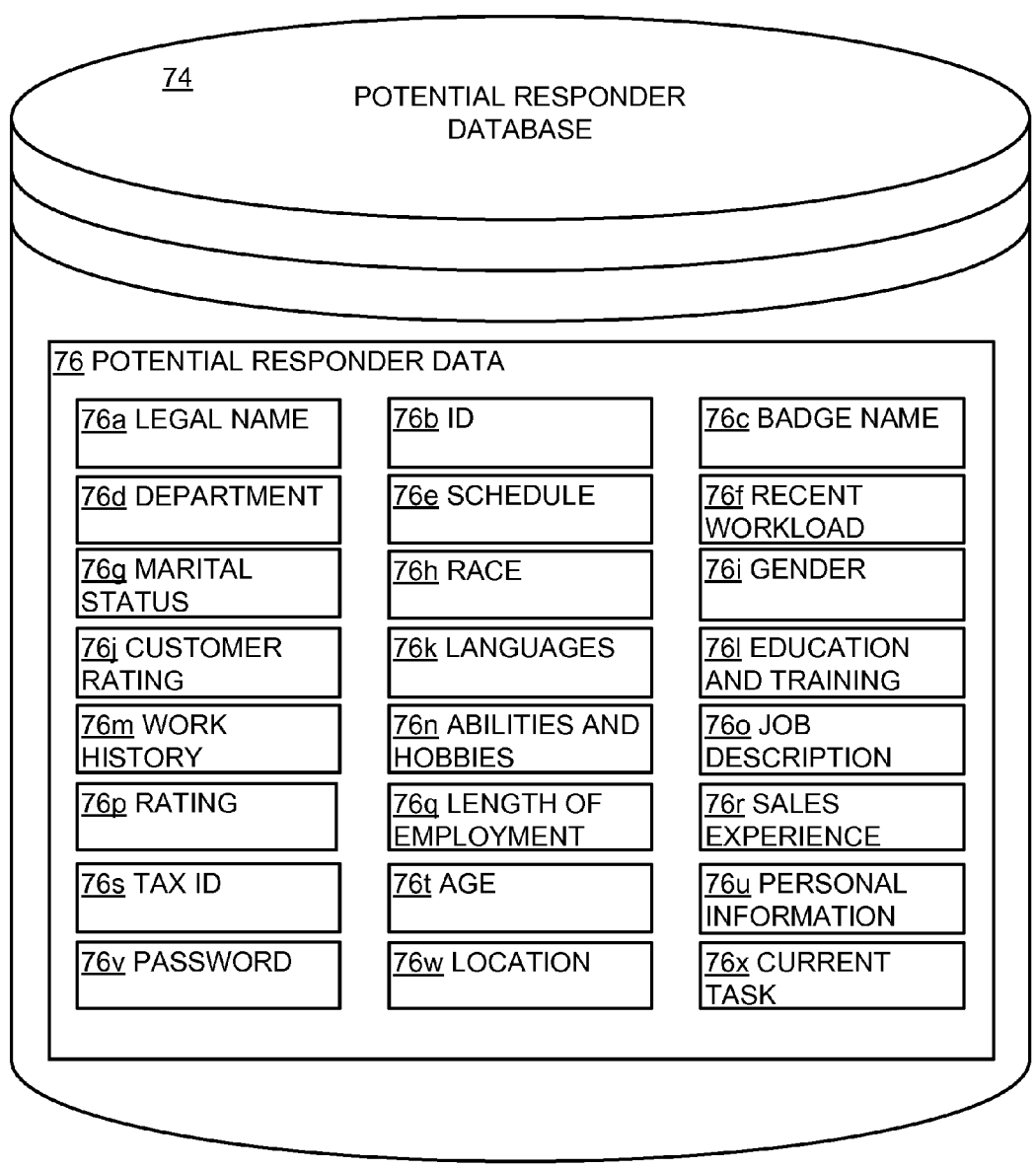
FIG. 6 is a block diagram of an exemplary potential responder database, constructed in accordance with the principles of the present invention.

FIG. 6 is a block diagram of an exemplary potential responder database 74 which may include demographic information of potential responders, i.e., potential responder data on multiple potential responders. Potential responder data includes relevant traits corresponding to potential responders. The potential responder data may be used to select a responder, from the multiple potential responders, to respond to an assistance request message. Potential responder data may include any data associated with a potential responder, who may be an employee or a sales associate of a retail store.

Potential responder database 74 may include exemplary potential responder data 76 corresponding to a potential responder. Potential responder data 76 may include the legal name 76a of a potential responder, an identification number 76b associated with a potential responder, a badge name 76c, a department 76d associated with a potential responder, a potential responder schedule 76e, potential responder recent workload 76f, marital status 76g, race 76h, gender 76i, customer service rating 76j, languages spoken 76k, education and training 76l, work history 76m, abilities and hobbies 76n, job description 76o, performance rating 76p, length of employment 76q, sales experience 76r, tax identification 76s, age 76t, personal information 76u, password 76v, a physical location (inside the store or on the grounds) of the potential responder 76w, current task 76x, and any other information that may be relevant in determining which potential responder may be an appropriate and qualified responder for responding to the assistance request message.

Elaborating on potential responder data 76, badge name 76c may be a nickname associated with the potential responder, which could be different than the legal name 76a of the potential responder. A department 76d associated with the potential responder may include a name of a retail store department, such as, a home department, a bed and bath department, a women department, a men department, a junior department, a kids department, a beauty department, a shoe department, a handbag department, an accessories department, a jewelry and watches department, etc. By way of example, the home department may include items such as electronics, lamps, outdoor furniture, kitchen appliances, rugs, home décor items, etc. The bed and bath department may include items like bedding, bathroom accessories, towels, pillows, mattresses, bathroom scales, hair dryers, etc.

The schedule 76e of the potential responder may specify the days and times the responder is scheduled to be at work. Schedule 76e may indicate whether the potential responder is on-site to assist customers, indicating that the potential responder may be chosen to respond to an assistance request message. The education and training 76l of the potential responder indicates whether the potential responder has specific training with respect to, for example, a retail store department or an item 24. By way of example, a potential responder who is trained in home electronics may assist customers who wish to buy, for example, home computers and laptops. The education and training 76l may further indicate certifications and degrees obtained by the potential responder, such as a cosmetology certification. Work history 76m may include a list of jobs and a length of time at each job. For example, work history 76m may indicate that a potential responder has been working with home electronics for 10 years. Work history 76m associated with a potential responder may also include a list of retail store departments that a potential responder has worked at. For instance, a potential responder may have work experience in the beauty department selling cosmetics.

The abilities and hobbies 76n associated with a potential responder may include activities that the potential responder is competent in or has interest in. For instance, the potential responder may have the ability to assemble and configure computers, notwithstanding that the potential responder did not receive formal training in this area. A hobby of the potential responder may include playing football and watching movies. A potential responder who is interested in movies may be better able to help a customer who has a question regarding purchasing movies than a potential responder who does not have an interest in movies. The performance rating 76p of the potential responder may indicate whether the responder has been categorized by the management as a top sales associate or whether the potential responder has been categorized as an employee with little sales experience who needs sales training and practice.

The length of employment 76q may include the amount of time the potential responder has worked at the retail store. The longer a potential responder has worked at the retail store, the more familiar the potential responder will be with items in the retail store and the more comfortable the potential responder will be in responding to a customer's inquiry. Sales experience 76r indicates the sales experience of a potential responder, which may be item specific. For example, a potential responder may not have experience selling women shoes, but may have extensive experience selling computer electronics. Other personal information 76u may include other relevant potential responder data, such as, for example, whether the potential responder owns item 24 carried by the retail store, like a cappuccino machine, which indicates that the potential responder can describe item 24 in detail and explain how to use item 24 to a customer. Location 76w may include the area of the retail store where the potential responder is located at a specific moment in time. Location 76w may be obtained automatically at set time intervals from responder mobile device 18. Current task 76x includes the current task being performed by a potential responder and whether the task is time-critical or not.

Figure 7:
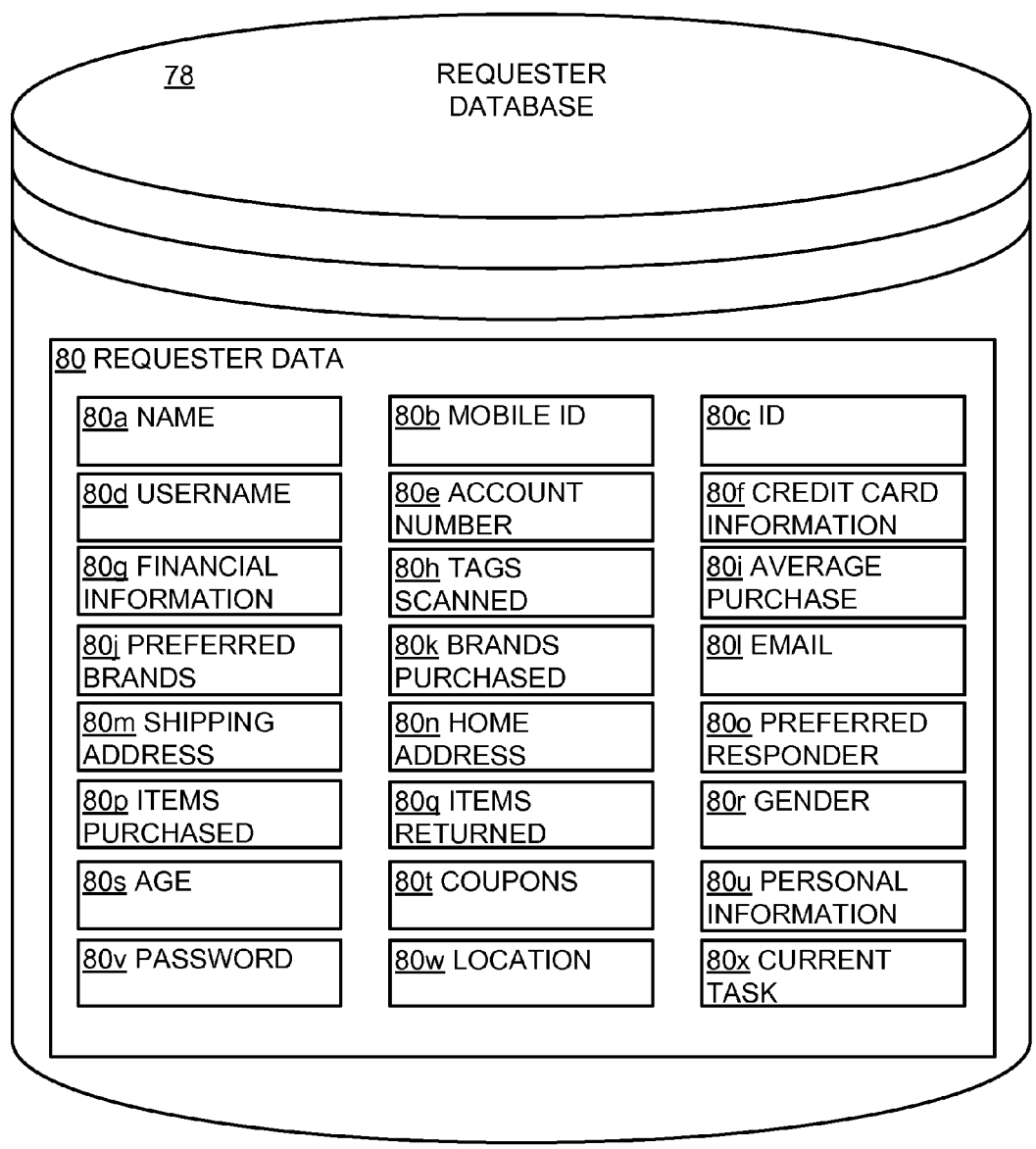
FIG. 7 is a block diagram of an exemplary requester database, constructed in accordance with the principles of the present invention.

FIG. 7 is a block diagram of an exemplary requester database 78, which may include demographic information on the requester. Requester database 78 may contain requester data 80 obtained from different sources, including commercial sellers of consumer's data. Requester data 80 may also be collected directly from a requester when a requester creates a requester user profile. Requester data 80 may include a name of a requester 80a, a requester mobile device identification number 80b, an identification number 80c, a username 80d, an account number 80e, credit card information 80f, financial information 80g, an email address 80l of a requester, a shipping address 80m, a home address 80n, a preferred responder 80o, previously purchased items 80p, items returned 80q, gender 80r, age 80s, coupons 80t, other personal information 80u, and a password 80v used to access a requester user profile, among other data. Requester database 78 may also store conduct data for each individual requester. For example, conduct data may include the type and number of tags scanned 80h by a requester within a defined period of time, an average purchase amount paid 80i by a requester for a type of item, a favorite or preferred brand of a requester 80j and a list of the most commonly brands purchased 80k by the requester.

Requester database 78 may include feedback information regarding a responder. The feedback information may be obtained from a requester. For example, after a requester sends an assistance request message and is assisted by a responder, response computer 16 may send to requester mobile device 12 a survey. The requester may be asked by the survey to rank their experience regarding a given responder for a given response event. The feedback may be stored in requester database 78 and potential responder database 74 as a feedback parameter. Additionally, the feedback information may be stored in a requester user profile. The survey sent by response computer 16 may request the requester to rate the responder that assisted them. For example, the survey may ask the requester whether the responder was helpful, knowledgeable, friendly, timely, enthusiastic, etc. The requester may rate the responder by submitting feedback information. If the requester inputs feedback information, response computer 16 may consider the feedback information in determining a responder. Feedback information associated with previous assistance request messages may be collected over time from the requester. Feedback information may be collected after a responder responds to assistance request messages. For example, if the requester inputs negative feedback information, response computer 16 may not choose that specific responder again to respond to an assistance request message from the requester, given that the requester has submitted negative feedback on a responder that responded to a previous assistance request message sent by the requester. On the other hand, if the requester sends positive feedback information for a responder for a previous assistance request message that the responder responded to, response computer 16 may select that responder again to respond to an assistance request message from the requester.

Figure 8:
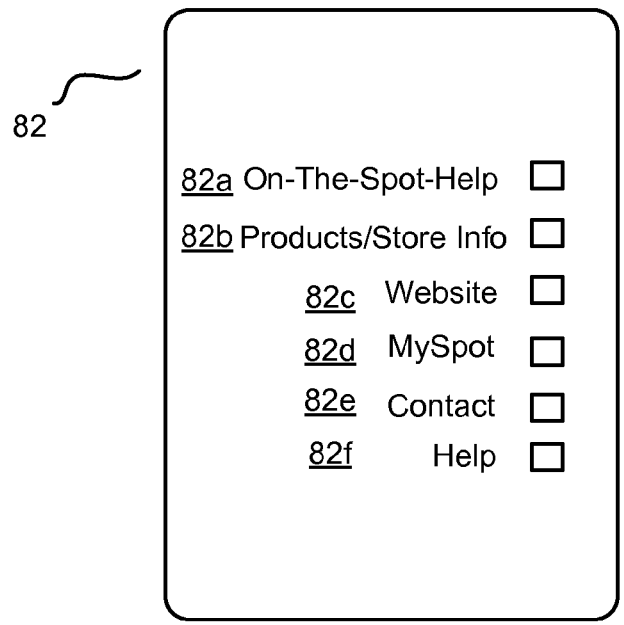
FIG. 8 is a block diagram of an exemplary requester user interface, constructed in accordance with the principles of the present invention.

FIG. 8 is an exemplary requester user interface 82 in requester mobile device 12. User interface 82 allows a requester, such as a customer, to interact with a requester mobile device application. Requester user interface 82 allows a requester to send an assistance request message soliciting help from a responder, e.g., soliciting that a sales associate meets the requester at the requester location. Requester user interface 82 receives at least one input parameter, such as the requester location, which is used to determine a responder. Requester user interface 82 includes menu options that can be selected by the requester. Requester user interface 82 may display menu options, such as "On-The-Spot-Help" option 82*a*, "Product/Store Info" option 82*b*, "Website" option 82*c*, "MySpot" option 82*d*, "Contact" option 82*e* and "Help" option 82*f*. Although only options 82*a* through 82*f* are shown in FIG. 8, the invention is not limited to such, and the requester user interface 82 may include less or more options.

The "On-The-Spot-Help" option 82*a* may be selected when a requester wants "On-The-Spot-Help" from a sales associate. Selecting "On-The-Spot-Help" option 82*a* causes requester user interface 82 to display an "On-The-Spot-Help" screen. The "On-The-Spot-Help" screen may include instructions on how at least one input parameter to determine a responder may be obtained. The instructions may advise the requester to scan tag 14 or bring requester mobile device 12 into close proximity to tag 14, so that requester mobile device 12 can obtain tag data from tag 14. Tag data may include the tag location or any information that may be used to determine the requester location. To obtain tag data, the instructions may direct the requester to "Please bump the nearest information tag, or select a location from the Location Menu, and a staff member will come to meet you shortly."

The "On-The-Spot-Help" screen may include a "Location Menu" option that allows a requester to manually select or input the requester location. When the requester is unable to find tag 14 to bump with requester mobile device 12 or the requester does not wish to bring requester mobile device 12 close to tag 14, the requester may manually input the requester location or may select the requester location from the "Location Menu" option. For example, selection of the "Location Menu" option may bring up a drop down list of store departments including, the shoe department, the juniors department, the sport equipment department, the toy department, the home appliances department, among other store departments. A requester may select the store department the requester is located at from the "Location Menu" option. The store department the requester is located at may be the at least one input parameter sent to response computer 16.

The "Product/Store Info" option 82*b* may be selected by a requester to obtain item data on an item 24 of interest. The "Product/Store Info" option 82*b* may also be selected when a requester would like to know information associated with the retail store, such as the departments available in the store, the hours of operation, etc. "Website" option 82*c* may be associated with a hyperlink, so that when a requester selects "Website" option 82*c*, a browser is redirected to a website associated with the hyperlink. For example, "Website" option 82*c* may be associated with a link to the retail store website, so that selection of "Website" option 82*c* causes the browser to launch the retail store website.

Selection of the "MySpot" option 82*d* may allow access to a requester user profile associated with the requester. The requester may enter requester information on their requester user profile. The requester information may be stored in requester database 78. Selection of "Contact" option 82*e* may display contact information of the retail store, such as a retail store telephone number, retail store address, and an email address of the customer service department of the retail store. Selection of the "Help" option 82*f* may display help articles and frequently asked questions regarding use of the requester mobile device application, such as the options available on user interface 82.

Figure 9:
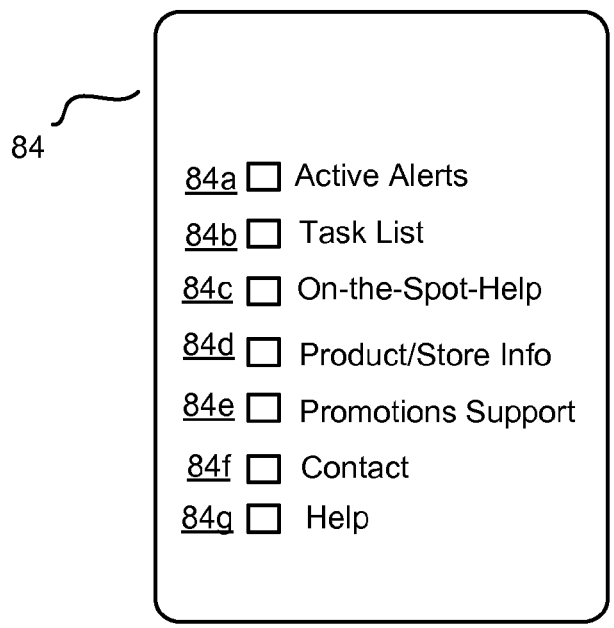
FIG. 9 is a block diagram of an exemplary responder user interface, constructed in accordance with the principles of the present invention.

FIG. 9 is an exemplary responder user interface 84 for the responder mobile device application in responder mobile device 18. Responder user interface 84 may include a name and logo of a retail store where the responder works. The responder user interface may include different options such as "Active Alerts" option 84*a*, "Task List" option 84*b*, "On-The-Spot-Help" option 84*c*, "Product/Store Info" option 84*d*, "Promotions Support" 84*e*, "Contacts" options 84*f*, and "Help" option 84*g*. Although only options 84*a* through 84*g* are shown in FIG. 9, the invention is not limited to such, and the responder user interface 84 may include less or more options.

Selection of the "Task List" option 84*b* may display a list of tasks that the responder is working on. Selection of the "Product/Store Info" option 84*d* may prompt the responder to scan or bump a tag or barcode associated with an item 24 to display a website containing information on item 24. When selected, the "Promotions Support" option 84*e* may display promotions and coupons that the responder may offer a requester. "Contacts" option 84*f* may display contact information, and "Help" option 84*g* may display frequently asked questions and general help on how to use the responder mobile device application.

The "On-The-Spot-Help" option 84*c* indicates the availability of an employee/responder. The "On-The-Spot-Help" option 84*c* may visually indicate whether the employee is on call to assist customers, i.e., whether the employee is available to receive and respond to assistance request messages, or whether the employee is unavailable. An employee may toggle the "On-The-Spot-Help" option 84*c* on and off, depending on whether the employee is available to receive and respond to assistance request message. The "On-The-Spot-Help" option 84*c* may indicate one of an on and off availability state, i.e., the option may indicate whether the employee is available ("on") or not available ("off") to assist a customer. For example, an employee who is already assisting a customer may select the "On-The-Spot-Help" option 84*c* to indicate that the employee is not available, i.e., the employee may turn-off their availability indicator. Once the employee finishes helping the customer, the employee may turn-on the "On-The-Spot-Help" option 84*c* to indicate their availability. Response computer 16 may receive the on and off state changes. The font of the "On-The-Spot-Help" option 84c may turn to yellow to visually indicate that the requester is on call.

"Active Alert" option 84a may visually indicate when an active alert is pending, i.e., when an availability inquiry message has been sent to responder mobile device 18. Responder mobile device 18 may vibrate, beep or may activate an alarm to indicate the receipt of the availability inquiry message. An availability inquiry message may be displayed as a text message on a display of responder mobile device 18. The font of the "Active Alert" option 84a on responder user interface 84 may change colors from green to red to show that an availability inquiry message has been received on responder mobile device 18. The font of "Active Alert" option 84a may become green when there are no active availability inquiry messages.

Selection of the "Active Alert" option 84a may cause responder user interface 84 to display the availability inquiry messages received by responder mobile device 18 and the status of each availability inquiry message. The availability inquiry message may include at least one input parameter included in the assistance request message (such as a location), a time, a type of assistance request, and an action to be taken or an action already taken by the responder. For example, an availability inquiry message may state "OTS help request—tools, Tu 3/15/12; 8:50 am—1:44 to go." In this example, "OTS help request" stands for "On-The-Spot help request," which indicates that a requester has requested "On-The-Spot-Help." This informs the responder that a requester wants to be assisted by a sales associate and has sent an assistance request message requesting help. The availability inquiry message further indicates the requester is located in the tools department, that the date and time of the request is Tuesday, Mar. 12, 2012 at 8:30 am, and that the action to be taken by the responder is "to go" to the tools department to assist the requester. The availability inquiry message may indicate a time that a responder may take to respond. For example, a time to respond may be automatically set to 2.5 minutes. The availability inquiry message may include a count-down of the time left for responder to respond. In the example above, the count-down shows one minute and forty four seconds left for the responder to reach the location of the requester to assist the requester. As such, the requester has already waited one minute and six seconds to receive assistance from the responder (2.5 minutes minus 1.44 minutes).

Other actions that a responder may take may include "cleared" which means that the responder has already assisted the requester, or "escalated" which means that the assistance request message from the requester was escalated to a superior. Further, an availability inquiry messages can be displayed in different colors, depending on the action associated with the availability inquiry message. For example, messages where the action is "to go" to the department specified in the availability inquiry message may be displayed in red. Messages having as action "cleared" may be displayed using green font, and "escalated" messages may be displayed in yellow font.

Figure 10:
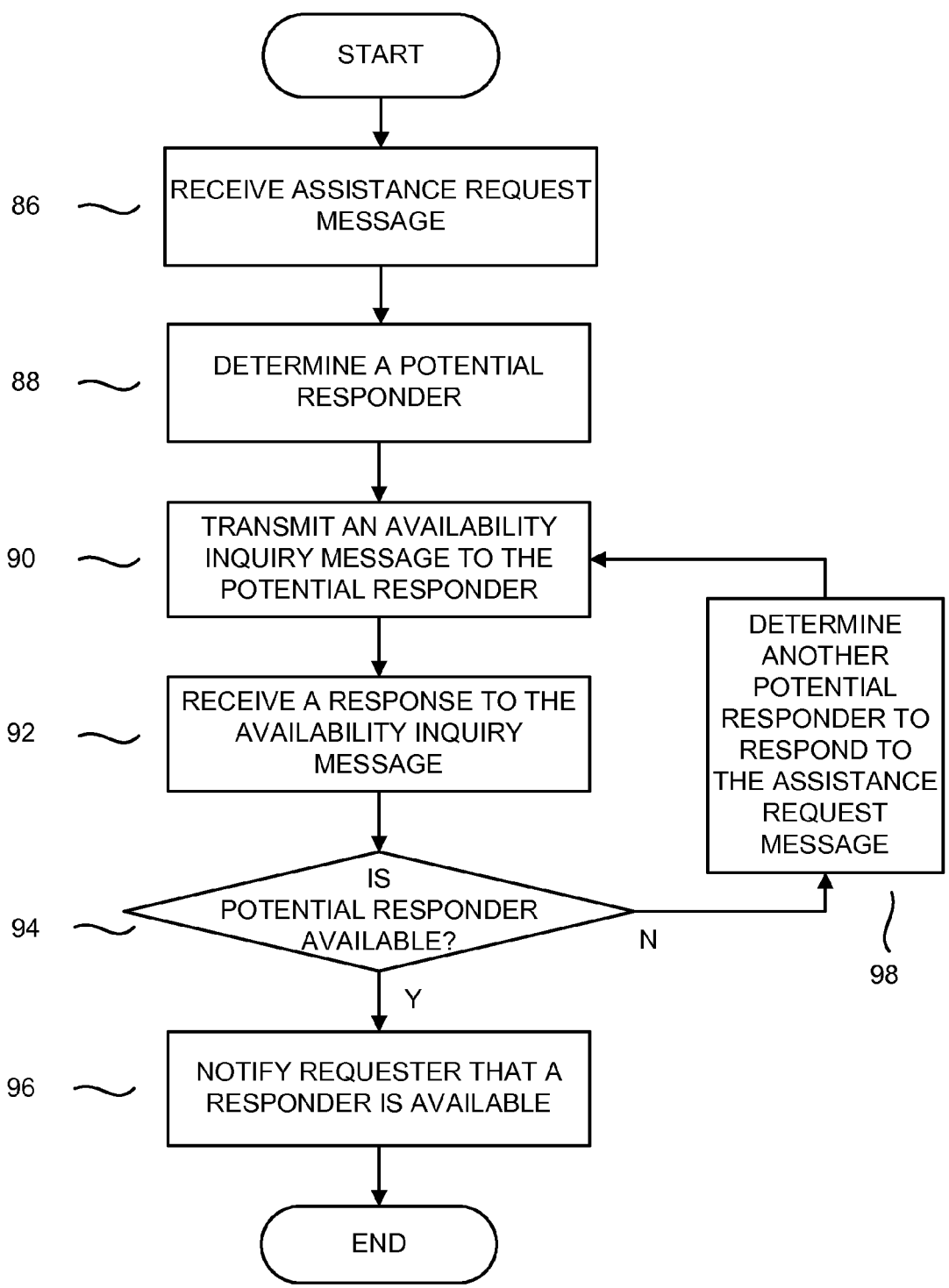
FIG. 10 is a flow chart of an exemplary process for responding to an assistance request message, in accordance with the principles of the present invention.

FIG. 10 is a flowchart of an exemplary process for handling an assistance request message. A requester, such as a customer in a store, may wish to obtain more information about item 24 or may wish to speak with a sales associate to inquire about, for example, the use of item 24, the return policy on item 24, the difference between item 24 and another item, whether item 24 is in stock, etc. To obtain assistance, the customer selects the "On-The-Spot-Help" option 82a on requester user interface 82. The customer proceeds to scans or bumps tag 14 to obtain tag data from tag 14.

Requester mobile device 12 sends to response computer 16 an assistance request message including at least one input parameter via communication network 20. The at least one input parameter may be obtained from tag data in tag 14 obtained by bumping tag 14, from input entered by the requester, and from requester database 78, such as when the requester has a requester user profile, among other sources. The at least one input parameter included in the assistance request message may be, for example, the requester location, tag data obtained from tag 14 and any requester data 80 stored in requester database 78, such as the name 80a of the requester, the requester username 80d, the requester mobile device identification 80b, etc. The at least one input parameter is used to determine a responder to respond to the assistance request message. The assistance request message may be sent via text message, email, SMS, or any other messaging service using communication protocols that allow the exchange of communications between response computer 16 and mobile devices.

Response computer 16 receives the assistance request message, which includes at least one input parameter, such as a location of the requester (Step 86). Response computer 16 may use the at least one input parameter to obtain additional input parameters from the requester, from item database 72, from responder database 74, from requester database 78, among other sources. The number of input parameters to be considered in determining a potential responder may be pre-configured. To determine a potential responder, response computer 16 uses the one or more input parameters received in the assistance request message and any additional input parameters obtained using the one or more input parameters to query potential responder database 74 (Step 88). For example, response computer 16 may analyze the at least one input parameter to determine the location of the requester and select a responder that is located proximate to the requester location.

Response computer 16 matches the requester with a potential responder based on the input parameter(s). Response computer 16 uses one or more input parameters to determine whether one or more potential responders are associated with potential responder data 76 that matches, conforms, relates, suits or corresponds to the one or more input parameters. The input parameters may include a set of criteria desired in a responder, such as desired traits of the responder. Therefore, a potential responder may be matched to a requester depending on whether the potential responder data 76 associated with the responder corresponds to the one or more input parameters.

Response computer 16 may identify a potential responder that is a compatible match by comparing the one or more input parameters with comparable potential responder data 76 stored in potential responder database 74. Response computer 16 may calculate a compatibility score for each potential responder based on the comparison of the input parameters with the potential responder data. One or more potential responders may be identified as suitable responders. Response computer 16 may select any responder having a compatibility score that meets a minimum threshold or a potential responder with the highest compatibility score. Each input parameter and/or potential responder data may be assigned a different weighting factor or ranking. Each input parameter may influence the compatibility score depending on its ranking. The ranking of each input parameter and/or potential responder data may also be used to create a subgroup of compatible potential responders and eliminate incompatible potential responders. Response computer 16 selects a responder from the subgroup of compatible potential responders.

Response computer 16 transmits an availability inquiry message to the selected potential responder to determine whether the responder is available to respond to the assistance request message (Step 90). The potential responder receives the availability inquiry message and replies by sending to response computer 16 a response using responder mobile device 18. The response indicates the availability of the potential responder, i.e., whether the potential responder is available to assist the requester/customer or whether the potential responder is not available to respond to the assistance request message. Response computer 16 receives the response to the availability inquiry message (Step 92) and determines the availability of the potential responder (Step 94). If the availability inquiry message indicates that the potential responder is available, then response computer 16 sends a notification message to the requester to indicate that a responder is available (Step 96). If the availability inquiry message indicates that the potential responder is unavailable, then response computer 16 selects another potential responder (Step 98).

In another exemplary embodiment, a requester may initiate an assistance request message by, for example, using requester mobile device application installed in requester mobile device 12. A requester may cause requester mobile device 12 to read an NFC tag, which then causes an SMS text or an email message to be sent from requester mobile device 12 to response computer 16. Response computer 16 may determine whether a potential responder is available to respond to the assistance request message. Alternatively, a requester may use the requester mobile device application to choose a location in the store from a list of locations displayed by the requester mobile device application on a screen of requester mobile device 12. Selection of a location from the list may cause an SMS or email message to be sent to response computer 16. Response computer 16 may determine a potential responder to respond to the assistance request message.

In another exemplary embodiment, a requester, such as a customer, may want to obtain item data associated with item 24 bearing tag 14. The requester selects the "Product/Store Info" option 82b on requester user interface 82. Selection of the "Product/Store Info" option 82b causes requester user interface 82 to display a "Request Product Info" screen. The "Request Product Info" screen may instruct the requester to obtain tag data by either scanning a barcode of item 24 or bringing requester mobile device 12 into close proximity to tag 14 affixed to item 24, so that requester mobile device 12 can obtain tag data from tag 14. Requester mobile device 12 sends the tag data to response computer 16. Response computer 16 receives the tag data and queries item database 72 using the tag data to retrieve item data associated with item 24. Response computer 16 may transmit item data stored in item database 72 to requester mobile device 12. Item data may include a hyperlink/web address 72h associated with item 24, where the hyperlink/web address 72 is associated with a website containing information on item 24. A browser in requester mobile device 12 may open the website so that the responder may view information on item 24. Alternatively, requester mobile device 12 may not send the tag data to response computer 16, and may instead receive and read the tag data. Tag data may include the address of a website containing information on item 24. A browser in requester mobile device 12 may open the website so that the responder may view information on item 24.

In another exemplary embodiment, a requester who may not have a requester mobile device, may ask a responder whether item 24 is available, i.e., whether the product is in stock. The responder may select the "Product/Store Info" option 84d on responder user interface 84. Selection of the "Product/Store Info" option 84d may cause responder user interface 84 to display a "Product Availability" screen. The "Product Availability" screen may instruct the responder to obtain tag data by either scanning a barcode of item 24 or to bring responder mobile device 18 into close proximity to tag 14 attached to item 24, so that responder mobile device 18 can obtain tag data from tag 14. Response computer 16 receives the tag data from responder mobile device 18. Response computer 16 may query item database 72 using the tag data to determine whether item 24 is in stock. Responder mobile device 18 may receive a message from response computer 16 indicating whether item 24 is available in stock. Other item data may be retrieved by response computer 16 from item database 72. For instance, response computer 16 may retrieve item data including hyperlink 72h, and may transmit hyperlink 72h to responder mobile device 18 so that a browser in responder mobile device 18 may open a website associated with hyperlink 72h. Alternatively, responder mobile device 18 may not send the tag data to response computer 16, and may instead receive and read the tag data. Tag data may include the address of a website containing information on item 24. A browser in responder mobile device 18 may open the website so that the responder may view information on item 24.

In another exemplary embodiment, the assistance request message received at response computer 16 from requester mobile device 12 may include requester data, such as a requester location, such as requester location 80w, as an input parameter. Requester location 80w may be a retail store department, like the electronics department. The input parameter included in the assistance request message may be used to query potential responder database 74 and obtain potential responder data 76. Specifically, response computer 16 may query potential responder database 74 for potential responders located close to the requester location, i.e., potential responders having as their associated current location 76w the electronics department. Once response computer 16 determines a potential responder, response computer 16 sends an invitation to the potential responder to respond to the assistance request message, i.e., an availability inquiry message. The availability inquiry message sent to the responder mobile device 18 associated with the responder includes the approximate requester location. The potential responder may accept or reject the invitation to respond to the assistance request message depending on multiple factors, such as whether the potential responder is available to assist, whether the potential responder is busy assisting another customer or whether the potential responder is attending to a time critical task.

On one hand, if the potential responder is available to assist and assents to respond to the assistance request message, the potential responder responds to the availability inquiry message confirming availability. The response sent by responder mobile device 18 to the availability request message is received at requester mobile device 12. Once the potential responder accepts to be the responder, response computer 16 sends a message to requester mobile device 12 to notify the requester mobile device that help is on the way. The responder proceeds to meet the requester at the requester location. On the other hand, if the potential responder rejects the invitation to be the responder for the assistance request message, i.e., responds to the availability inquiry message by indicating unavailability, response computer 16 determines another potential responder and sends the other potential responder an availability inquiry message. If the other potential responder accepts the invitation to respond to the assistance request message, response computer 16 sends to requester mobile device 12 an acknowledgement message indicating that a responder is on his/her way to assist the requester. Else, response computer 16 continues determining potential responders and sending them availability inquiry messages until response computer 16 receives a response indicating that the potential responder is available to respond to the assistance request message. Response computer 16 may determine that no potential responders are available to respond to the assistance request message. In this case, response computer 16 may send a message to requester mobile device 12 stating that at the moment, there are no responders available to provide assistance to the assistance request message. The assistance request message may be queued in memory 56 of response computer 16, so that when a potential responder becomes available, response computer 16 may choose the potential responder to respond to the queued assistance request message.

In another exemplary embodiment, the requester may be associated with a requester user profile. When the requester has a requester user profile, the requester mobile device application on requester mobile device 12 may include in the assistance request message one or more of requester data 80*a*-80*x* as input parameters. Response computer 16 may choose a responder from multiple potential responders by evaluating the input parameter(s). For example, processor 46 in response computer 16 may query requester database 78 using the least one input parameter, which may be a name of a requester 80*a*. Response computer 16 may determine by querying requester database 78 using a name of a requester 80*a*, additional input parameters for use in determining a potential responder. For example, response computer 16 may query requester database 78 to determine whether the requester has specified a preferred responder 80*o* to respond to assistance request messages sent by the requester. If requester database 78 includes a preferred responder 80*o* entry for the requester, response computer 16 may use preferred responder 80*o* as an input parameter to query responder database 76 when determining a potential responder. The preferred responder 80*o* may be "Joseph R." As such, response computer 16 determines a potential responder associated with potential responder data 76 corresponding to the input parameter. In other words, response computer 16 determines which potential responder is associated with a legal name 76*a* that includes "Joseph R.," which corresponds to the input parameter "Joseph R."

Further, response computer 16 may determine whether preferred responder 80*o* is at work, by querying responder database 74 for schedule 76*e* associated with preferred responder 80*o*. By analyzing schedule 76*e*, response computer 16 may determine whether preferred responder 80*o* is working on-site or not. If preferred responder 80*o* is not on-site, response computer 16 will determine an alternative responder to respond to the assistance request message. If response computer 16 determines that preferred responder 80*o* is on-site, response computer 16 may query potential responder database 74 to determine a current task 76*x* being performed by the potential responder. If the current task 76*x* is not a time-critical task, processor 46 selects the preferred responder 80*o* to respond to the assistance request message and sends to preferred responder 80*o* an availability inquiry message. However, if the current task 76*x* is a time-critical task, processor 46 determines another potential responder that may respond to the assistance request message. The preferred responder may respond by indicating availability, i.e., accepting to be the responder to the assistance request message, or may respond by indicating unavailability. Response computer 16 may send to the responder mobile device 18 a requester user profile associated with the requester in response to receiving the response to the availability inquiry message from responder mobile device 18. The requester user profile may include requester data 80 which may be reviewed by the responder before helping the requester. In this way, the responder may learn information on the requester, such as which brands 80*k* the requester purchased before, etc., and may provide personalized help to the requester accordingly.

In another exemplary embodiment, the assistance request message sent by requester mobile device 12 may include one or more requester data 80*a*-80*x* as input parameters. For instance, requester data 80*a*-80*x* may include a requester username 80*d*. Response computer 16 may query requester database 78 using username 80*d* and retrieve from requester database 78 additional input parameters to be used in determining a potential responder, such as the gender 80*r* and age 80*s* of the requester. Response computer 16 may attempt to find a potential responder of the same gender and age bracket as the requester. Response computer 16 may query responder database 74 using gender 80*r* and age 80*s* as input parameters. Response computer 16 may search for a potential responder whose gender 76*i* is the same as the gender 80*r* of the requester, and whose age 76*t* is in the same age bracket as the requester.

In the case where two or more potential responders are of the same gender and age as the requester, response computer 16 may either (i) randomly choose a potential responder of the two or more potential responders to respond to the assistance request message or (ii) may select a potential responder from among the two or more potential responders based on additional input parameters, such as, potential responder data 76, requester data 80, tag data and item data in item database 72. For example, response computer 16 may further query potential responder database 74 to determine which one of the two or more potential responders has education and training 76*l* on items sold in the store department where the responder is located. Response computer 16 may also determine whose turn is to respond to an assistance request message by evaluating the recent workload 76*f* of the potential responders. Response computer 16 may proceed to select the potential responder with the lowest recent workload 76*f* and/or the potential responder that has more education and training 76*l*. Which potential responder is selected may depend on a relevance value given to the input parameters. Some input parameters may be more relevant than others.

In another exemplary embodiment, the determination of another potential responder is based at least on tag data read from tag 14 affixed to shelf 22 or item 24. Tag data may include, for example, a numeric item identifier. Response computer 16 may query item database 72 using as input parameter the tag data, i.e., the item identifier, and retrieve additional input parameters associated with the tag data. Additional input parameters that may be retrieved include, for example, an item location 72*n* and the item price 72*d*. Response computer 16 may select a potential responder based on the input parameters: item identifier 72*k*, item location 72*n* and item price 72*d*. Response computer 16 may query potential responder database 74 for potential responders with location 76*w* corresponding to item location 72*n*, who have education and training 76*l* on products with item identification 72*k* and with sales experience 76*r* selling items that cost about the same as item price 72*d*.

In another exemplary embodiment, a responder may be determined using probabilistic logical methods, such as fuzzy logic. Processor 46 in response computer 16 may be configured to use fuzzy logic in order to determine a responder to respond to the assistance request message. Fuzzy logic can be used to determine sufficiently good outputs quickly, e.g., to quickly assign a suitable responder. A responder may be selected using one or more input parameters. Determination of an appropriate responder can be achieved using one or more input parameters stored in tag 14, responder database 74, requester database 78 and/or item database 72. Each input parameter may be assigned a different weighting factor to establish its influence in selecting a responder. Similarly, input parameters may be attributed different degrees of relevance in relation to each other, e.g., different truth values. A responder may be determined using fuzzy logic even when responder database 74, requester database 78 and item database 72 include incomplete data, i.e., do not include a complete set of parameters. Potential responder database 74 may have incomplete potential responder data 76, for instance, it may be missing the age 76*t* of some potential responders.

In another exemplary embodiment, a potential responder may be determined using threshold selection. Thresholding includes assigning a different threshold value to input parameters stored in tag 14, responder database 74, requester database 78 and/or item database 72. For example, input parameters relating to sales experience, i.e., sales experience 76*r*, may be given a higher threshold value than input parameters relating to the age 76*t* or the gender 76*i* of potential responders. Input parameters may be assigned threshold values that are above or below a predetermined threshold value. Input parameters that are above or equal the predetermined threshold may be used to determine a potential responder, and different thresholds may be set for different types of input parameters.

For example, sales experience 76*r* may be considered as an input parameter only when the number of years of experience exceeds three years, i.e., the predetermined threshold value for the sales experience 76*r* input parameter is three years. Thresholding may be useful in separating input parameters that are characterized as relevant from input parameters that are irrelevant or less relevant. A predetermined threshold may consist of a specific value or a range of values. A potential responder may also be determined using a step function. The output, i.e., the determined responder, may depend on whether the input parameters fall under a specific boundary defined by a step function. When the input parameter falls under the specified boundary, the input parameter is used to determine the responder.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, e.g., a point of sale terminal, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A computer comprising,
   a receiver, the receiver in communication to receive an assistance request message initiated by a requester mobile device associated with a requester, the assistance request message including at least one input parameter, the at least one input parameter including a location associated with the requester;
   a processor in communication with the receiver, the processor coupled to a memory device and executing instructions to:
   compare the at least one input parameter to at least responder data associated with a plurality of responders, the responder data being stored in at least one database;
   select a responder, from the plurality of responders, to respond to the assistance request message based at least on the comparison of the at least one input parameter to the at least responder data, the selected responder being associated with responder data and the at least one input parameter;
   a transmitter in communication with the receiver and the processor, the transmitter in communication to transmit an availability inquiry message to a responder device associated with the responder, the availability inquiry message being an invitation to assist the requester associated with the assistance request message;
   the receiver in communication to receive a response message to the availability inquiry message from the responder device, the response message indicating whether the responder has accepted or rejected the invitation to assist the requester associated with the assistance request message; and
   when the response message to the availability inquiry message indicates that the responder accepted the invitation to assist the requester associated with the assistance request message, the transmitter is further in communication to transmit a notification message to the requester mobile device indicating that a responder will assist the requester associated with the assistance request message.

2. The computer of claim 1, wherein the at least one input parameter includes at least one of a responder identification and an item identification.

3. The computer of claim 2, wherein the assistance request message is one of a text message and an email sent from a responder mobile device.

4. The computer of claim 1, wherein the responder data includes at least one of a responder current task, a responder recent work load and a responder training.

5. The computer of claim 1, wherein the responder data is one of a plurality of responder parameters, each of the plurality of responder parameters being assigned a different one of a plurality of relevance values, and wherein the processor executes instructions to determine the responder based at least in part on the relevance value assigned to each of the plurality of responder parameters.

6. The computer of claim 1, wherein when the response message to the availability inquiry message indicates that the responder is unavailable:
The processor executes instructions to determine from the plurality of responders, another responder to respond to the assistance request message.

7. The computer of claim 1, wherein the processor executes instructions to trigger execution of a requester mobile device application on the requester mobile device upon the requester entering an area, the requester mobile device application configured to allow the mobile device to initiate the assistance request message.

8. The computer of claim 1, wherein the availability request message is a text message and the at least one input parameter in the assistance request message includes tag data.

9. The computer of claim 1, wherein in response to the receiver receiving the response message to the availability inquiry message from the responder device that indicates the responder accepted the invitation to assist the requester associated with the assistance request message, the transmitter is in communication to transmit to the responder device a requester profile.

10. The computer of claim 1, wherein the at least one input parameter includes feedback information relating to the responder, the feedback information being received from the requester mobile device after the responder responds to a previous assistance request message sent by the requester.

11. A method comprising:
receiving at a response computer, an assistance request message initiated by a requester mobile device associated with a requester, the assistance request message including at least one input parameter, the at least one input parameter including a location associated with the requester;
comparing the at least one input parameter to at least responder data associated with a plurality of responders, the responder data being stored in at least one database;
selecting a responder from the plurality of responders, to respond to the assistance request message based at least on the comparison of the at least one input parameter to the at least responder data, the selected responder being associated with responder data and the at least one input parameter;
transmitting from the response computer, an availability inquiry message to a responder device associated with the responder, the availability inquiry message being an invitation to assist the requester associated with the assistance request message;
receiving, at the response computer, a response message to the availability inquiry message from the responder device, the response message indicating whether the responder has accepted or rejected the invitation to assist the requester associated with the assistance request message; and
when the response message to the availability inquiry message indicates that the responder accepted the invitation to assist the requester associated with the assistance request message, transmitting, from the response computer, a notification message to the requester mobile device indicating that a responder will assist the requester associated with the assistance request message.

12. The method of claim 11, wherein the at least one input parameter is associated with one of a tag, an item, the responder and the requester.

13. The method of claim 11, wherein the at least one input parameter includes at least one of a responder identification and an item identification.

14. The method of claim 11, wherein the responder data includes at least one of a responder current task, a responder recent work load and a responder training.

15. The method of claim 11, wherein the responder data is one of a plurality of responder parameters, each of the plurality of responder parameters being assigned a different one of a plurality of relevance values, and wherein the determining is based at least in part on the relevance value assigned to each of the plurality of responder parameters.

16. The method of claim 11, further comprising: causing a requester mobile device application to execute on the requester mobile device upon the requester entering a predetermined area.

17. The method of claim 11, wherein the at least one input parameter in the assistance request message includes tag data.

18. The method of claim 11, wherein in response to receiving the response message to the availability inquiry message from the responder mobile device indicating that the responder accepted the invitation to assist the requester associated with the assistance request message, transmitting to the responder mobile device a requester profile.

19. A method for using a requester mobile device for sending an assistance request message, the method comprising:
receiving at the requester mobile device, tag information from a tag;
initiating at the requester mobile device, an assistance request message;
transmitting, from the requester mobile device, the assistance request message to a response computer, the assistance request message including the tag information and a location associated with the requester mobile device;
comparing at the response computer, the tag information to at least responder data associated with a plurality of responders, the responder data being stored in at least one database;
selecting at the response computer, a responder from the plurality of responders, to respond to the assistance request message based on the comparison of the tag data to the at least responder data, the selected responder being associated with responder data and the tag information;
transmitting from the response computer, an availability inquiry message to a responder device associated with the responder, the availability inquiry message being an invitation to assist the requester associated with the assistance request message;
receiving at the response computer, a response message to the availability inquiry message from the responder device, the response message indicating whether the responder has accepted or rejected the invitation to assist the requester associated with the assistance request message;
determining at the response computer, that the response message indicates that the responder accepted the invitation to assist the requester associated with the assistance request message;
transmitting from the response computer, a notification message to the requester mobile device;

receiving at the requester mobile device, the notification message from the response computer, the message indicating that a responder will assist the requester associated with the assistance request message, the responder being associated with the location and tag information.

20. The method of claim 19, wherein receiving, at the requester mobile device, tag information from a tag includes using near field communications (NFC) to receive the tag information the tag information including at least one of a name of an item associated with the tag, a price of the item associated with the tag and a model of the item associated with the tag.

21. The method of claim 19, wherein receiving, at the requester mobile device, tag information from a tag includes using near field communications (NFC) to receive the tag information, the tag information including at least one of availability of an item associated with the tag, customer reviews of the item associated with the tag and a rating of the item associated with the tag.

\* \* \* \* \*